Dec. 5, 1944.     F. HOTCHNER     2,364,293
CHAMFERING TOOL
Filed Dec. 26, 1942
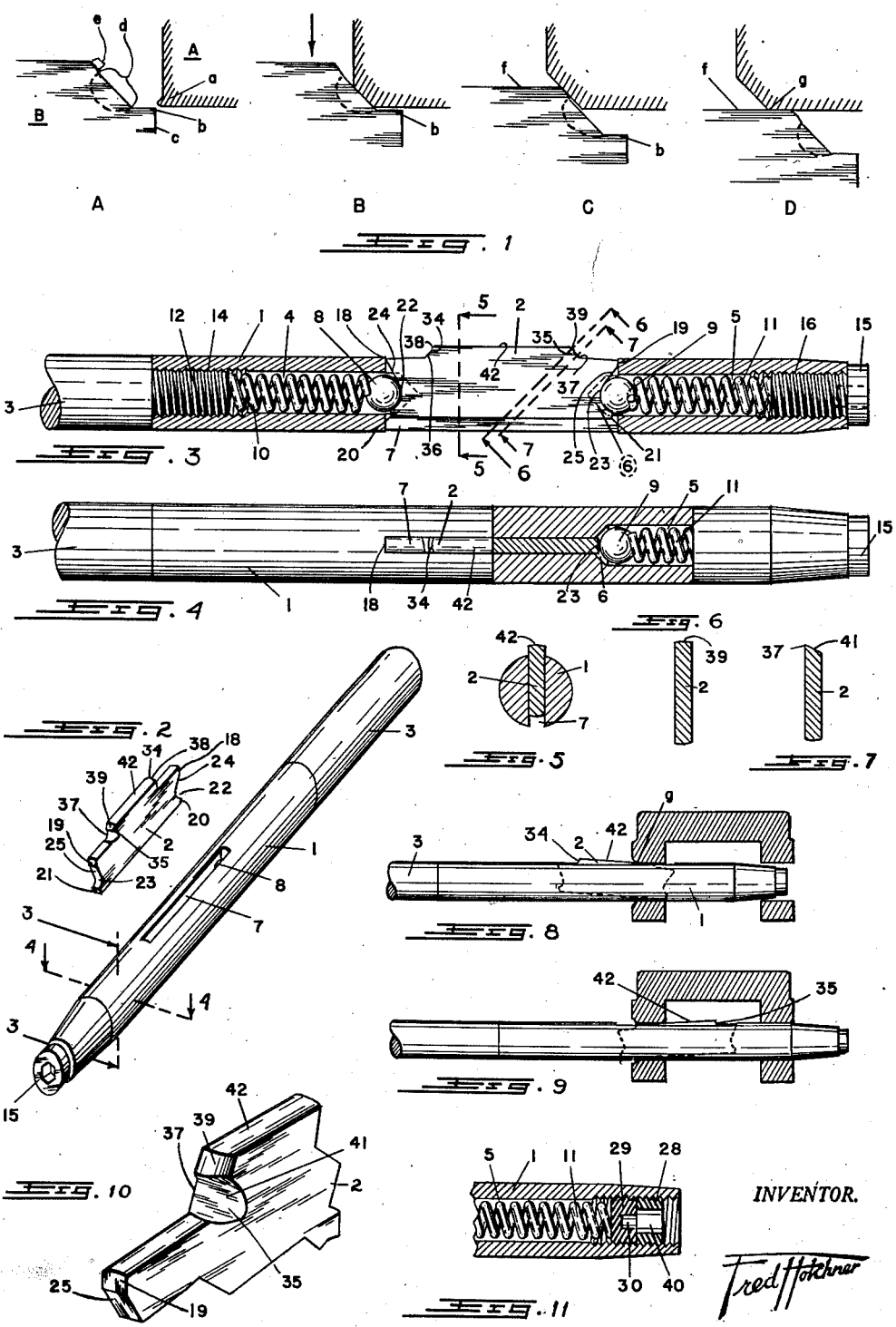
INVENTOR.
Fred Hotchner Patented Dec. 5, 1944

2,364,293

UNITED STATES PATENT OFFICE 2,364,293

CHAMFERING TOOL

Fred Hotchner, Los Angeles, Calif.

Application December 26, 1942, Serial No. 470,293

4 Claims. (Cl. 77—73.5)

This invention provides a chamfering tool for removing the burrs and chamfering the edges of holes drilled in metal or other material and is directed to the production of a tool which in a simple pass and return through the work will remove the burrs and chamfer both edges of a single hole or each of a series of holes, leaving smoothly cut surfaces of uniform dimensions.

It is an object to produce a tool of this type having a bit which automatically retracts into the holder after finishing each cut to eliminate the necessity of the operator engaging one hand for this purpose. The bit retracts as it passes into the hole and protrudes from the holder as it emerges from the hole into the position to cut the edge of the next hole in line if there are a series of holes, or the opposite edge of a single hole, on the return movement.

In the preferred form of the invention shown in the drawings it is an object to cause the bit to enter and emerge from the hole angularly so as to bear for the greater part of the time on the edges of the hole to minimize the chances of wearing or scoring the wall of the hole.

It is a further object to provide a tool of the minimum number of parts which may be readily disassembled for inspection and cleaning, but from which the bit may be readily removed without the necessity of disassembling the tool. Thus, a number of bits, each adapted to a particular material or dimension of cut, may be provided and used selectively with the tool. The bit may further be readily removed for sharpening and upon being replaced in the holder will take its exact former position, thus avoiding the temptation for mechanics to sharpen the tool in the holder and possibly damage it.

It is an object to produce a tool which will be subject to the minimum possibility of clogging from chips, but which, if clogged, may be quickly cleaned without removing the tool from the machine.

It is a further object to produce a tool having a bit which may be repeatedly resharpened without changing the attainable dimensions or finish of the cut surface, and which will operate in substantially the same manner throughout the useful life of the bit.

Other objects of the invention will be apparent from the following specification taken in connection with the drawing in which the invention is shown in a preferred embodiment thereof.

The principle of the operation of the tool is shown by a series of illustrations in Figure 1 showing stage by stage the finishing of one end of a hole by a bit which retracts while remaining parallel with the tool axis.

The preferred embodiment of this invention in a tool having a bit which tilts in passing through the hole to minimize wear on the hole wall is shown in the following figures in which Figure 2 is a perspective view of such a tool with its bit shown removed from the holder.

Figure 3 is a sectional view of the tool with the bit in place taken along a plane cutting the arbor axis and parallel with the broad face of the bit as indicated by the section line 3—3 in Figure 2.

Figure 4 is an elevation of the tool taken along a line of view perpendicular to that of Figure 3 with a portion of the tool shown in sectional view as indicated by section line 4—4 in Figure 2.

Figure 5 is a cross section of the tool taken as indicated by the section line 5—5 in Figure 3.

Figures 6 and 7 are cross sections of the bit taken as indicated respectively by the section lines 6—6 and 7—7 in Figure 3 showing the contours of the safe edge and the cutting edge of the bit.

Figures 8 and 9 illustrate the tilting action of the bit as it passes through a hole in a shackle.

Figure 10 is an enlargement in perspective of the entering edge of the bit taken from substantially the same angle as the bit is seen in Figure 2 showing the grind of the bit and the relationship of the cutting edge to the safe edge.

Figure 11 is a sectional view of a spring adjustment arrangement which may optionally be used to vary the pressure on the bit.

The invention is capable of numerous embodiments other than the preferred construction shown and is therefore to be broadly construed within the purview of the appended claims as including all modifications thereunder and all substantial equivalents of the terms thereof.

In Figure 1 I have shown the edge of a hole through a body of material A and the entering edge of the bit B being turned against the work piece by my tool. The metal around the hole has been forced up into a burr $a$ by the previous drill operation. This burr is to be removed and the hole chamfered.

In illustration A of this figure the bit is approaching the work, the shoulder $b$ just passing under the burr. This shoulder clears the wall of the hole and has no function in itself, the working face of the bit being spaced backward of the edge $c$ to avoid the danger of chips working down between the forward edge of the bit and the end of the slot.

The working face of the bit is divided into two positions. The portion bracketed and indicated by *d* is sharpened by grinding a clearance (indicated by the dotted line) backward from the cutting edge shown. The portion bracketed and indicated by *e* is a "safe" edge which will not cut when forced against the work piece. Preferably this portion is slightly higher than the cutting edge as shown.

In illustration B the cutting operation is under way. Shoulder *b* has entered the hole followed by the cutting edge *d* which is now removing metal to form the chamfer after disposing of the burr. Pressure is being developed against the bit in the direction of the arrow because of the slant of the surface being finished. The tool should be so constructed that, as long as metal is being removed, the bit will not retract, but that as soon as the safe edge bears against the work the bit will move in the direction of the arrow.

In illustration C the bit is seen partially retracted after the cutting has been completed and the safe edge forced against the tapered surface of the chamfer. In the last illustration D the bit has been completely retracted and is passing through the hole.

As the most practicable construction involves a spring to return the bit, there will be rubbing between the outer edge *f* of the bit and the wall of the hole. While in this figure I have shown the bit moving back parallel to the tool axis, in the following figures I show a tool constructed so that the bit tilts as it moves in so that the rubbing action is confined to the corner *g* of the finished hole for the greater part of the travel of the bit into the hole.

The application of this principle to a commercial tool is shown in Figures 2 to 11, in which views the same reference numeral indicates the same part throughout.

The tool consists of three sections; the body or arbor 1, the bit 2, and the extension shank 3. The body consists of a rod having two drilled holes 4 and 5 extending from either end to taper bottoms which serve as ball seats. One of these seats is seen in Figure 4, indicated by numeral 6. A slot 7 is cut across the rod cutting into the ends of these tapered bottoms. The balls 8 and 9 are held down in the holes by the springs 10 and 11. The spring 10 is held down by the threaded end 12 of the extension shank 3 which is screwed into the tapped end 14 of hole 4. Likewise spring 11, holding down ball 9 is held down by the headed socket screw 15 in the threaded end 16 of hole 5.

The bit 2 is a flat piece of tool steel fitting snug to the side walls of the slot and relieved at the ends so that either end may tilt inward with the end edges snug to the end walls of the slot. Thus the corners 18 and 19 fit close to the end walls of the slot while the opposite corners of the bit, indicated by 20 and 21 have been relieved. The indentations 22 and 23 in the ends of the bit receive the balls and determine the normal position of the bit as the balls are pressed home by the springs. The reliefs of 20 and 21 facilitate the ready snapping of the bit into the holder. The amount of pressure which must be applied to the bit to depress it into the holder is determined by the slope of the indentation. I have shown the edges of the indentations between the balls and the working edges of the bit sloped at 24 and 25 for what would be the minimum working pressure in this respect. By decreasing these slopes or giving these surfaces special contours, the working pressure may be increased or made to vary in any desired special manner.

Thus for cutting in soft metal which may tend to be swagged by the rubbing of the edge 42 of the bit, the contour of the surfaces 24 and 25 may be made so that the pressure falls off sharply when the bit is fully depressed. For working very hard metal this slope will be kept sharp in order that the bit will not move backward until it has made its maximum cut.

It is preferable to provide an assortment of bits with each tool, each bit having its cutting edges as well as the indentations ground for working with a different metal.

The resistance of the bit to depression may also be varied by providing for adjustment of the spring pressure. In Figure 11 I show one suitable adjusting device as applied to the end of the tool. A socket screw 29 is turned down by a wrench fitting into the hexagon socket 30 and passing freely through the hexagon hole 40 through the jam screw 28. A similar arrangement may be used at the extension shank to adjust the other spring.

In practice, however, I deem it advisable to dispense with spring adjusting means for the sake of simplification and provide for ordinary variations of cutting conditions by suitable contouring of the bit indentations. For extraordinary conditions, such as the cutting of very hard metals, an extra set of stiff springs can be supplied and inserted as quickly as adjustment may be effected by an adjusting device.

The ball seats should be dimensioned so that when the bit is in normal position the balls are just lifted from their seats, and close the openings against dirt by snapping closed on their seats when the bit is removed.

The working surfaces of the bit, indicated by 34 and 35, should be recessed from the ends of the bits a sufficient distance to avoid the chips turning back and wedging between the ends of the bit and the end walls of the slot. Thus for a bit ground for use in metal which does not turn a hard chip, this recession may be held to a low figure or eliminated. Since the clearance between the sides of the bit and the side walls of the slot may be held much closer than the clearance at the ends there is no danger of chips working down the sides in these spaces.

The grinding of the working surfaces is shown in Figure 10 in which the back of the bit is seen. By a single sloping grinding cut 41, forming a relief surface, the cutting edge 37 is produced, the safe edge 39, preferably slightly rounded, remains dull. I prefer to finish the cutting edge slightly recessed from this safe edge so that it is spaced away from the finished cut when the bit depresses as shown in illustration C of Figure 1. The opposite surface, or "face", of the bit may be ground to a rake if found desirable and as is customary with such material as mild steel. However, the chamfering operation does not remove the same heavy chip produced by such operations as drilling, and hence the face of the bit may be left flat to the work in most cases. This permits of continued regrinding of the bit for a long life.

The bit may be reground until the changing leverage of the reaction from the balls interferes with the tilting action. The slope of the edges 24 and 25 may then be changed, or the spring tension adjusted and the bit used for more regrindings. Thus a long life may be developed by bits in my tool. The final conditions which terminate the use of any single bit will depend on the conditions of the work, the major factors being apparent from Figures 8 and 9, in which the tilting action of the bit is shown as it passes through the first hole of a shackle.

In Figure 8 the bit is shown after it has completed the chamfering of the first edge of the hole and has been carried part way through the hole. The forward edge of the bit has been depressed, driving back the corresponding ball and compressing the spring. The longitudinal edge 42 of the bit is now bearing against the corner g of the chamfered hole, the wall of the hole being protected from direct contact with the bit edge until the bit is nearly centered in the hole. For a short interval contact is made along the wall of the hole and then as the bit passes the central position the forward edge snaps out as shown in Figure 9 and bearing is made against the other end of the hole.

As the bit emerges from the hole the cutting edge 36 may cut this corner slightly. This is of no consequence however, as the finishing of this edge is done by the return pass of the bit after passing into and returning through the other hole. From this it will be seen that the life of the bit will ordinarily be terminated when it has been ground back so far that the tilting action cannot take place except in such cases as those in which the wear on the wall of the hole is not objectionable. In such instances the bit may be reground and used until practically the entirety of the edge 42 has been used up.

In the use of this tool it ordinarily will be driven by the chuck of a lathe, drill press or other stationary machine, and the work fed to the tool by hand. It may also be used in an electric drill or flexible shaft drive. By the use of an extension shank of suitable length, any number of holes may be finished in line in one operation. In the first pass into the work piece the work face 35 chamfers one end of each of the holes, and on the return pass the work face 34, having a similar cutting edge 36 and a similar safe edge 38, finishes the opposite end of each hole.

If the holes in the work piece are too close together for the bit to protrude between them in its original condition, the recession of the work faces should be increased by grinding back until the remaining portion of edge 42 can fully protrude in the passage between the holes. However, as will be seen from Figure 9, the tool will operate even though the bit does not fully protrude between one hole and the next as long as the leading work face, 35 in this case, protrudes its full extent and consideration is given to this condition in the grind of the tool.

The term "spring means" as used in the claims embraces any resilient means for returning the bit to the normally protruding position.

Having thus described my invention, what I claim is:

1. A chamfering tool comprising; an arbor having an opening, a bit radially movable in said opening from a position within the arbor to a position in which a portion of the bit protrudes along one side of the arbor, and spring means urging the bit into the position in which said portion protrudes from said arbor, said protruding portion having a dull outer edge and a diagonal edge at each end thereof extending therefrom to the arbor surface and facing in opposite directions along the arbor, each of said diagonal edges being sharpened as a cutting edge from the arbor surface to a point near its outer end and dulled as a safe edge the remainder of the distance to its junction with the said outer edge, said cutting edge having a formation such as to cut a beveled chamfer around the edge of a hole in a work piece through which the arbor is passed and said safe edge being formed to come into contact with the finished chamfered surface, terminate the cutting action, and by bearing along the finished chamfered surface, press the bit into the arbor.

2. A chamfering tool comprising; an arbor having an opening, a bit longitudinal with the arbor movable radially in said opening from a position within the arbor to a position in which a portion of the bit protrudes along one side of the arbor, said protruding portion having a dull outer edge and a diagonal edge at each end thereof extending therefrom to the arbor surface and facing in opposite directions along the arbor, each of said diagonal edges being sharpened as a cutting edge from the arbor surface to a point near its outer end and dulled as a safe edge the remainder of the distance to its junction with the said outer edge, said cutting edge having a formation such as to cut a beveled chamfer around the edge of a hole in a work piece through which the arbor is passed and said safe edge being formed to come into contact with the finished chamfered surface, terminate the cutting action, and by bearing along the finished chamfered surface, press the bit into the arbor, and spring means urging each longitudinal end of the bit independently into the protruding position.

3. A chamfering tool comprising; an arbor having an opening, a bit radially movable in said opening from a position within the arbor to a position in which a portion of the bit protrudes along one side of the arbor, and spring means urging the bit into the position in which said portion protrudes from said arbor, said protruding portion having a diagonal cutting edge extending from the arbor surface to a point near the outer end of the bit and a dull safe edge therefrom to the outer end of the bit, said cutting edge being formed to cut a beveled chamfer around the edge of a hole in a work piece through which the arbor is passed and said safe edge being formed to come into contact with the finished chamfered surface, terminate the cutting action, and by bearing along the finished chamfered surface, press the bit into the arbor.

4. A chamfering tool comprising; an arbor having an opening, a bit longitudinal with the arbor movable radially in said opening from a position within the arbor to a position in which a portion of the bit protrudes along one side thereof, said protruding portion having a diagonal cutting edge extending from the arbor surface to a point near the outer end of the bit and a dull safe edge therefrom to the outer end of the bit, said cutting edge being formed to cut a beveled chamfer around the edge of a hole in a work piece through which the arbor is passed and said safe edge being formed to come into contact with the finished chamfered surface, terminate the cutting action, and by bearing along the finished chamfered surface, press the bit into the arbor, and spring means urging each longitudinal end of the bit independently into the protruding position.

FRED HOTCHNER.